June 9, 1953     C. ENSEY     2,641,501
PRESSURE-RELIEF ACCESSORY FOR AUTOMOBILE BODIES
Filed May 27, 1952
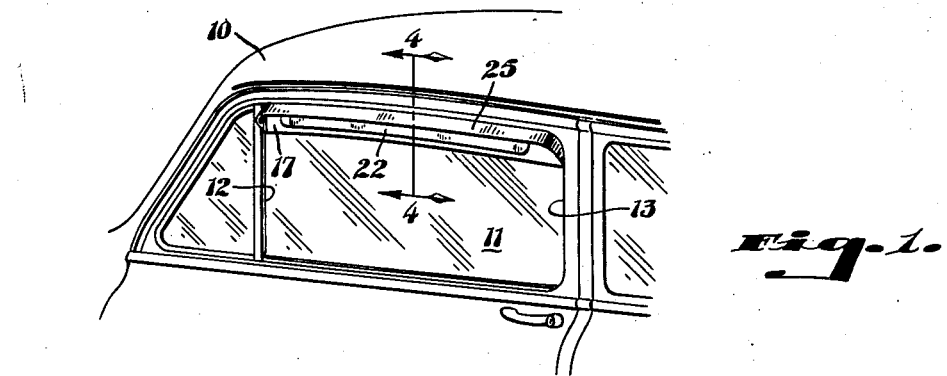
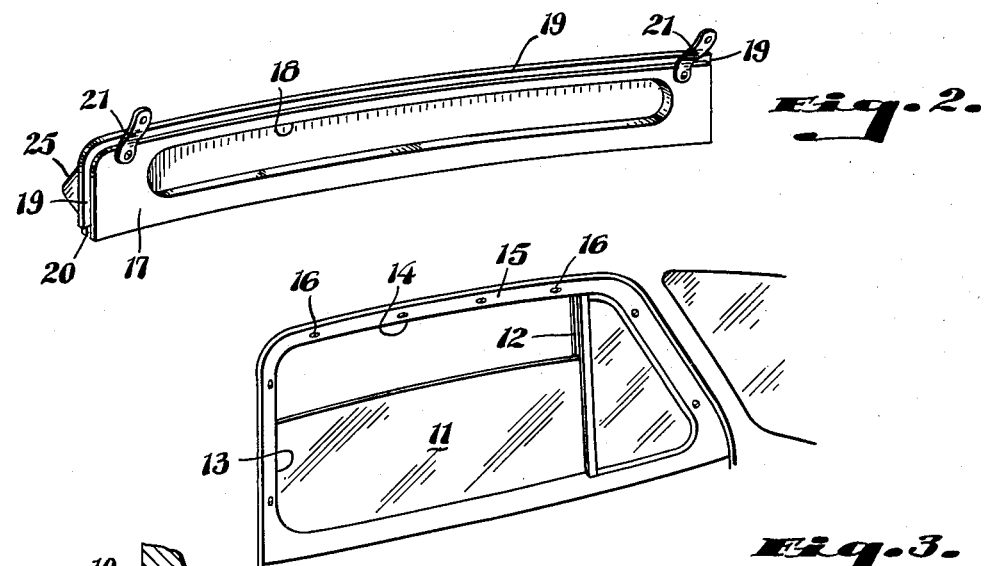
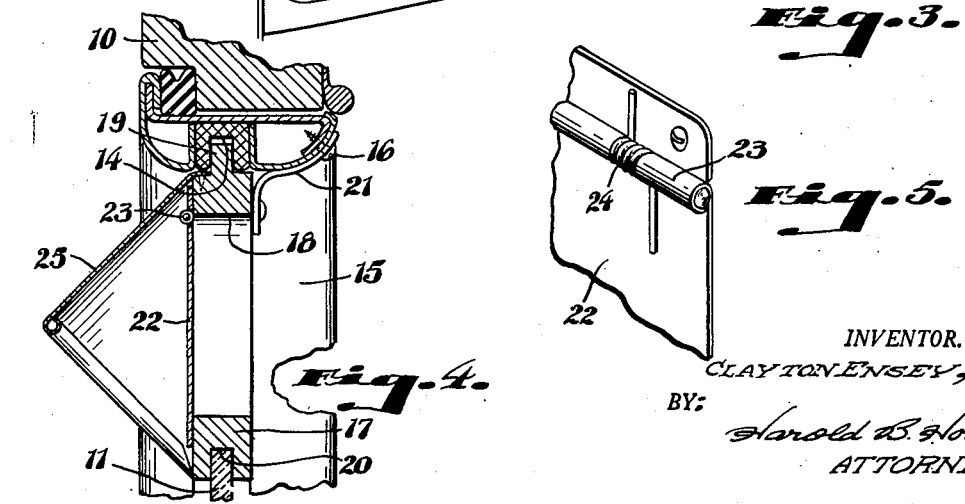
INVENTOR.
CLAYTON ENSEY,
BY: Harold B. Hood
ATTORNEY.

Patented June 9, 1953

2,641,501

UNITED STATES PATENT OFFICE 2,641,501

PRESSURE-RELIEF ACCESSORY FOR AUTOMOBILE BODIES

Clayton Ensey, Rockville, Ind.

Application May 27, 1952, Serial No. 290,298

4 Claims. (Cl. 296—44)

The present invention relates to an accessory for use on a closed automobile body or truck cab whereby pressure within the body, caused by the rapid closing of the door, may be effectively relieved.

The primary object of the invention is to provide a pressure-relief accessory which can be readily mounted in a window opening of an automobile body without the use of special tools and without the necessity for drilling, cutting or otherwise disfiguring the body.

A further object is to provide a shield for such accessory whereby the valving means therein is protected from rain, snow, and the like, thereby preventing the freezing of such valving means during cold weather.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a fragmentary perspective view of an automobile body showing the manner in which my invention is used therewith;

Fig. 2 is a perspective view of the side of my accessory which faces the interior of the automobile body;

Fig. 3 is a fragmentary perspective view of a window in an automobile body looking from the interior of such body;

Fig. 4 is a transverse sectional view of my accessory taken substantially on the line 4—4 of Fig. 1 and drawn to a larger scale; and Fig. 5 is a further enlarged, fragmentary perspective view showing a detail of my invention.

Referring more particularly to the drawings, it will be seen that I have shown a closed automobile body 10 having a movable window 11 therein, slidable in spaced, substantially vertical side channels 12 and 13 and seatable, when closed, in a substantially horizontal top channel 14. These channels are held in place in the conventional automobile by means of a frame 15 secured by screws 16.

My accessory comprises a relatively narrow, elongated frame or plate 17 having a longitudinal port 18 therein. The plate is shaped to conform substantially to a narrow strip of the upper portion of window 11, so that, when the window is partially open as shown in Fig. 3, the plate will completely fill the opening.

From the top and lateral edges of plate 17, a lip or flange 19 projects outwardly; and, in the preferred form of my invention, the flange will be uninterrupted. A channel 20 is provided along the lower and remaining edge of said plate. In use, the flange 19 is inserted in the top window channel 14 and in the side channels 12 and 13. The window 11 is then raised until the upper edge of the window is firmly seated in the window slide channels 12, 13 and 14.

Such an arrangement effectively holds the plate in place in the window opening, but in order that the window can be lowered without disturbing or releasing the accessory, I prefer to provide means for attaching the plate 17 to frame 15. To this end, I provide one or more brackets 21 fixed to plate 17 and arranged to overlie the frame 15, each bracket registering with a selected one of the screws 16. Such selected screws are removed from the frame, passed through suitable perforations in brackets 21 and reseated in the tapped holes in said frame. Thus the plate 17 is prevented from becoming unseated from the window slide channels when the upper edge of window 11 is moved out of seating engagement with channel 20.

To the exterior surface of plate 17 a flap 22 is hinged as at 23 to overlie and completely close the port 18. Movement of flap 22 outwardly about hinge 23 will open port 18. While the flap 22 will usually assume a closed position relative to said port, due to the effect of gravity, I prefer to provide spring means 24 to resiliently hold the flap in such port closing position.

Preferably, a downwardly-opening shield 25 is fixed along the upper region of plate 17. Rain and snow are thereby prevented from striking the flap 22 and its hinge 23 and rendering them inoperative due to freezing, or the like.

In conventional closed automobile body construction, it is found that, when all of the body windows are closed, closure of the final door is difficult because of air pressure which builds up in the body as that door is moved toward closed position. A distinct pressure-surge is felt by occupants of the body, to their discomfort, and frequently, because of this pressure-surge, the door will not move to fully-latched position, with the result that the vehicle may be driven with a partially unlatched door. Such a condition, of course, is dangerous for numerous reasons.

With my accessory in place, however, these difficulties are automatically overcome. Any tendency to build up pressure within the body will be obviated by automatic opening of the valve plate 22, against the light pressure of the spring 23, whereby the door will close easily and fully, and the passengers will be protected against the above-mentioned discomfort resulting from such a pressure-surge.

In this specification, the term "automobile body" is intended to include also the term "truck cab" and the like.

I claim as my invention:

1. For use with a closed automobile body having a movable window therein slidable in spaced, substantially vertical side channels and seatable, when closed, in a substantially horizontal top channel, a pressure-relief accessory comprising a frame shaped to conform substantially to the shape of the upper portion of said window, the lateral edges thereof being enterable in said side channels and the upper edge thereof being seatable in said top channel, said frame having a port therethrough and a channel along the lower edge thereof in which the upper edge of said window is seatable when said window is closed while said accessory is so seated, one-way valve means carried on said frame permitting air flow through said port from the interior to the exterior of said automobile body, and a shield supported exteriorly upon said frame in masking relation with said valve means to prevent rain and snow from striking said valve means.

2. The device of claim 1 in which said valve means comprises a flap hinged to the exterior of said frame and covering said port to close the same, and including means for resiliently holding said flap in such port closing position.

3. For use with a closed automobile body having a movable window therein slidable in spaced, substantially vertical side channels and seatable, when closed, in a substantially horizontal top channel, a pressure relief accessory comprising an elongated narrow plate shaped to conform substantially to a relatively narrow strip along the upper portion of said window, said plate having a longitudinally extending port therethrough, a flange projecting therefrom along the top and lateral edges thereof, and a channel along the bottom edge thereof, said flange being enterable in said top and side channels and the upper edge of said window being seatable in the channel along the bottom edge of said plate when said window is closed while said flange is so seated, a flap hinged along one edge to the exterior of said plate and covering said port to close the same, spring means engaging said flap to resiliently hold the same in such port closing position, and a shield supported on said plate in masking relation with said flap to prevent rain and snow from striking said flap.

4. An automobile accessory comprising an elongated, narrow plate having a longitudinal port therethrough, an outwardly projecting flange along one of the longer edges thereof, oppositely projecting flanges along the two shorter edges thereof, and a channel formed along the other of the longer edges of said plate, a flap hinged to said plate and overlying said port to completely close the same, spring means engageable with said flap to resiliently hold the same in such port closing position, and a shield supported on said plate to overlie said flap, said shield opening toward the said other longer edge of said plate.

CLAYTON ENSEY.

References Cited in the file of this patent

UNITED STATES PATENTS

| Number | Name | Date |
|---|---|---|
| 1,628,053 | McTighe | May 10, 1927 |
| 1,660,893 | Smith | Feb. 28, 1928 |
| 1,785,891 | Danat | Dec. 23, 1930 |
| 2,224,494 | White | Dec. 10, 1940 |
| 2,234,781 | Schjolin | Mar. 11, 1941 |
| 2,297,892 | Jacobs | Oct. 6, 1942 |